(12) United States Patent
Hoyer et al.

(10) Patent No.: US 8,170,983 B2
(45) Date of Patent: May 1, 2012

(54) MANAGING DATA ACROSS A SEMANTIC DATA VIEW AND A PRESENTATION DATA VIEW

(75) Inventors: Crystal L. Hoyer, Redmond, WA (US);
Cynthia C. Shelly, Seattle, WA (US);
Dawn M. Wright, Seattle, WA (US);
Karen K. Wong, Seattle, WA (US);
Matthew J. Kotler, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/781,843

(22) Filed: May 18, 2010

(65) Prior Publication Data

US 2010/0275156 A1    Oct. 28, 2010

Related U.S. Application Data

(63) Continuation of application No. 11/496,281, filed on Jul. 31, 2006, now Pat. No. 7,743,079.

(51) Int. Cl.
*G06F 7/00* (2006.01)

(52) U.S. Cl. ......... 707/602; 707/610; 709/248; 715/203

(58) Field of Classification Search ............ 707/602
See application file for complete search history.

(56) References Cited

U.S. PATENT DOCUMENTS

| | | | |
|---|---|---|---|
| 4,974,194 A | 11/1990 | Barker et al. | 364/900 |
| 5,555,362 A | 9/1996 | Yamashita et al. | 395/145 |
| 5,950,215 A * | 9/1999 | Tabuchi | 715/200 |
| 6,208,955 B1 * | 3/2001 | Provan et al. | 703/20 |
| 6,414,698 B1 | 7/2002 | Lovell et al. | 345/800 |
| 6,502,114 B1 | 12/2002 | Forcier | 715/273 |
| 6,667,750 B1 | 12/2003 | Halstead, Jr. et al. | 345/788 |
| 6,792,448 B1 | 9/2004 | Smith | 709/204 |
| 6,826,727 B1 | 11/2004 | Mohr et al. | 715/517 |
| 6,976,214 B1 | 12/2005 | Bates et al. | 715/532 |

(Continued)

FOREIGN PATENT DOCUMENTS

EP        0 364 189        4/1990

(Continued)

OTHER PUBLICATIONS

Robert C. Miller et al., "LAPIS: Smart Editing with Text Structure," Demonstrations, CHI 2002: changing the world, changing ourselves, Minneapolis, MN, Apr. 20-25, 2002, pp. 496-497.

(Continued)

*Primary Examiner* — Fazlul Quader
(74) *Attorney, Agent, or Firm* — Merchant & Gould

(57) ABSTRACT

Managing data across a semantic data view and a presentation data view may be provided. A semantic model may be represented in a semantic data view and a presentation model may be represented in a presentation data view. The presentation model may correspond to a graphical representation of the semantic model. In addition, a command may be received directed toward the semantic data view or the presentation data view. The semantic model and the presentation model may be operated upon according to the received command. Furthermore, the semantic model represented in the semantic data view and the presentation model represented in the presentation data view may be updated in response to operating on the semantic model and the presentation model according to the received command. The semantic model and the presentation model may be simultaneously maintained in a volatile memory in a computer.

20 Claims, 13 Drawing Sheets

U.S. PATENT DOCUMENTS

| | | |
|---|---|---|
| 6,978,422 B1 | 12/2005 | Bushe et al. .................. 715/734 |
| 7,010,746 B2 | 3/2006 | Purvis ........................... 715/517 |
| 7,743,079 B1 | 6/2010 | Hoyer et al. |
| 8,006,179 B2 | 8/2011 | Hoyer et al. |
| 2002/0111969 A1 | 8/2002 | Halstead, Jr. ................. 707/517 |
| 2003/0076350 A1 | 4/2003 | Vu ................................. 345/738 |
| 2003/0105589 A1* | 6/2003 | Liu et al. ............................ 702/1 |
| 2003/0126136 A1* | 7/2003 | Omoigui ......................... 707/10 |
| 2004/0172594 A1 | 9/2004 | Jones et al. ................... 715/512 |
| 2004/0181543 A1* | 9/2004 | Wu et al. ....................... 707/102 |
| 2005/0005239 A1 | 1/2005 | Richards ....................... 715/530 |
| 2005/0005249 A1 | 1/2005 | Hill et al. ...................... 715/963 |
| 2005/0050477 A1 | 3/2005 | Robertson et al. ............ 715/853 |
| 2005/0052405 A1 | 3/2005 | Maulik et al. ................. 345/156 |
| 2005/0057576 A1 | 3/2005 | Shen et al. .................... 345/619 |
| 2005/0286065 A1 | 12/2005 | Gauthier et al. |
| 2006/0066632 A1* | 3/2006 | Wong et al. ................... 345/619 |
| 2008/0028299 A1 | 1/2008 | Hoyer et al. ................. 715/246 |

FOREIGN PATENT DOCUMENTS

| | | |
|---|---|---|
| WO | WO 9 428 480 | 12/1994 |

OTHER PUBLICATIONS

Robert C. Miller et al., "Multiple Selections in Smart Text Editing," pp. 103-110.

On the Web sun.com/aboutsun/comm._invest, Staroffice 8 Impress, 2005, Sun Microsystems, Inc., pp. 1-20.

Greg Ross, "Hybrid Information Visualisation Environment," http://www.dcs.gla.ac.uk/~gr/hive.htm, 2 pgs.

Toshiyuki Masui, "Graphic Object Layout with Interactive Genetic Algorithms," pp. 74-80, 1992, IEEE.

Oreas—Automatic Diagram Layouts, http://www.oreas.de/layouts_en.php, 3 pgs.

Christian Seybold et al., "An Effective Layout Adaptation Technique for a Graphical Modeling Tool," Proceedings of the 2003 International Conference on Software Engineering, Portland, pp. 826-827.

U.S. Office Action dated Feb. 19, 2010 cited in U.S. Appl. No. 11/496,521.

U.S. Office Action dated Aug. 3, 2010 cited in U.S. Appl. No. 11/496,521.

U.S. Final Office Action dated Jan. 19, 2011 cited in U.S. Appl. No. 11/496,521.

* cited by examiner

MANAGING DATA ACROSS A SEMANTIC DATA VIEW AND A PRESENTATION DATA VIEW

RELATED APPLICATIONS

This application is a Continuation of co-pending U.S. application Ser. No. 11/496,281 entitled "Managing Data Across a Semantic Data View and a Presentation Data View" filed Jul. 31, 2006, which is related to U.S. patent application Ser. No. 11/496,521, filed Jul. 31, 2006, entitled "Wrapping Nodes in a Drawing Canvas," which are hereby incorporated by reference.

BACKGROUND

Visual aids help people understand information. Conveying information to or among groups of people may require creating visual presentations embodying the information. Graphics application programs, such as the Microsoft® PowerPoint® presentation application, have helped automate creating such visual presentations. Such graphics application programs allow users to convey information more efficiently and effectively by putting that information in an easily understandable format.

A graphic is a visual idea representation, such as a diagram or other drawing. A graphic is typically composed of several graphical elements (e.g. shown in a presentation data view) that represent content embodying the idea, such as, for example, a bulleted list (e.g. shown in a semantic data view). Each graphical element is a part of the displayed graphic. A graphical element can have both textual characteristics and graphical characteristics. Graphical characteristics generally refer to pictorial or other graphical element visual features. Textual characteristics generally refer to the written matter within the graphical element. Depending on the information and the audience, a graphics application program user generally determines a specific graphic that will best teach or convey the underlying information.

In some situations, the user may need to know whether they have an element selected in the semantic data view or the presentation data view because commands may work on only a subset of the presentation or semantic data visible in one of the views. Consequently, confusion may result because the user does not see updates in both locations (e.g. the semantic data view and the presentation data view). Thus, the conventional strategy does not allow the user to see how commands may apply to their presentation and semantic data simultaneously. Furthermore, the conventional strategy does not enable the user to see semantic and presentation data both selected at the same time, so that the user can more easily match the data between the views.

SUMMARY

Managing data across a semantic data view and a presentation data view may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Managing data across a semantic data view and a presentation data view may be provided. A semantic model may be represented in a semantic data view and a presentation model may be represented in a presentation data view. The presentation model may correspond to a graphical representation of the semantic model. In addition, a command may be received directed toward the semantic data view or the presentation data view. The semantic model and the presentation model may be operated upon according to the received command. Furthermore, the semantic model corresponding to the semantic data view and the presentation model corresponding to the presentation data view may be updated in response to operating on the semantic model and the presentation model according to the received command. The semantic model and the presentation model may be simultaneously maintained in a volatile memory in a computer.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
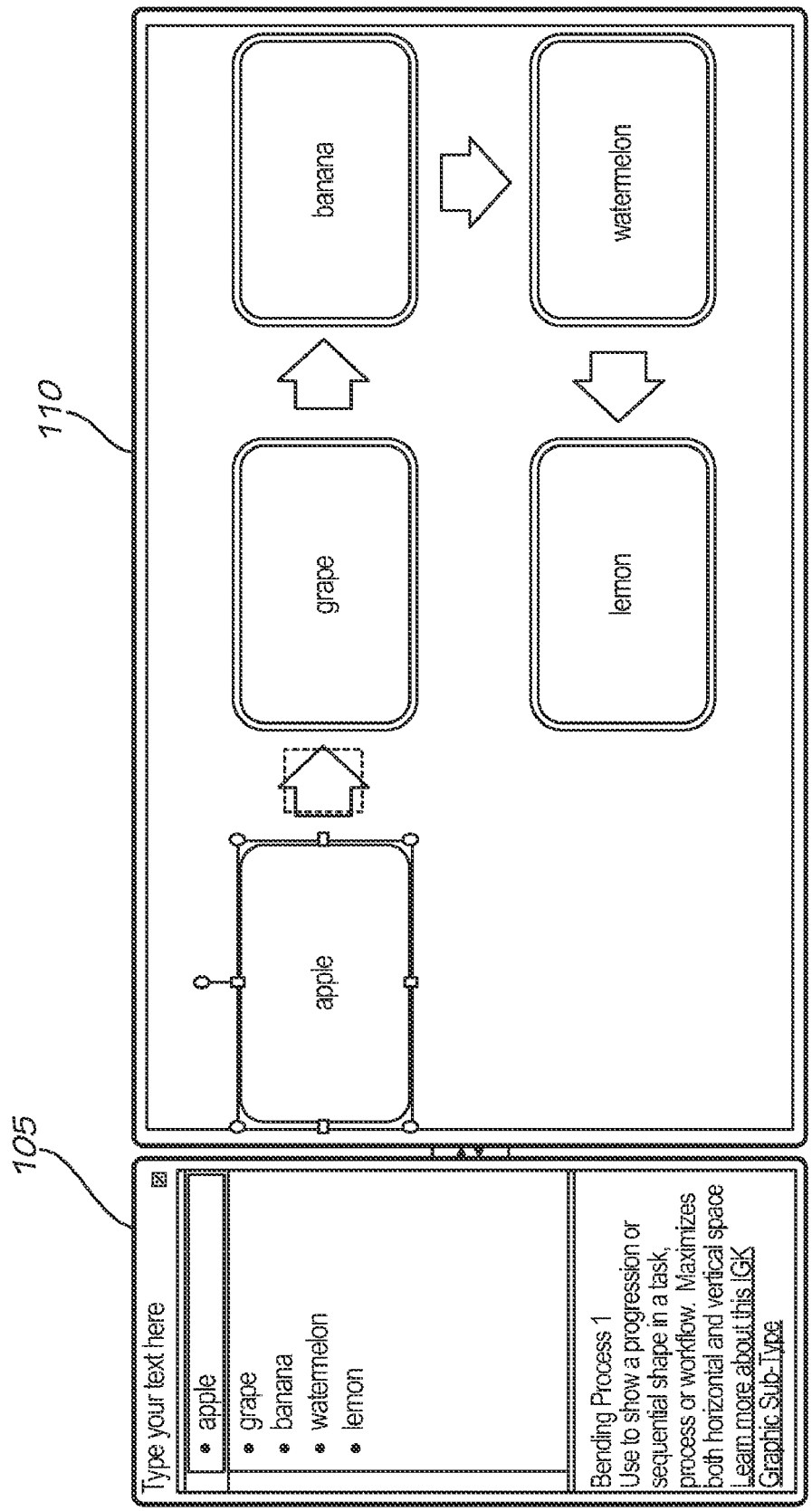
FIG. 1 shows a semantic model and a presentation model.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the invention's proper scope is defined by the appended claims.

Managing data across a semantic data view and a presentation data view may be provided. For example, as shown in FIG. 1, both a semantic model (e.g. in a semantic data view 105) and a presentation model (e.g. in a presentation data view 110) associated with the semantic model may be provided. Semantic data view 105 may comprise, but is not limited to, a text pane. Moreover, presentation data view 110 may comprise, but is not limited to a drawing canvas. The semantic model may utilize different data attributes (e.g. properties). For example, the different data attributes may comprise, but are not limited to, a data hierarchy, color, size, margin, and style. The aforementioned are examples and other data attributes may be used.

Because embodiments of the invention include both a semantic and a presentation model that may be directly related to one another, embodiments of the invention may allow both presentation and semantic parts of the model to be selected. That selection may then be presented in any given view by rendering a highlight around an element, whether the element is a presentation element or semantic element. For example, if a listing of all of the transition elements in a graphic is displayed, then the selection could be used to determine which semantic transition elements should display selection highlights in that view. This could be a view in addition to the text pane view of the data. As a further example, another pane may display all of the images used in the diagram (this can be semantic information). The selection information could then be use to highlight the images that correspond to shapes that are selected in the drawing canvas. In yet another example, embodiments of the invention may include multiple simultaneous views that each display a different presentation of the same semantic data. Consequently, even if the shapes were different in each view, embodiments of the invention may have a way to meaningfully select elements in every view so that the user could tell that a shape in one view corresponds to a different shape in another view (for example, the bottom shape in the pyramid corresponds to the first shape in the process diagram).

Consistent with embodiments of the invention, users may not need to know whether they have an element selected in semantic data view 105 or presentation data view 110, because commands may work simultaneously in both places. To avoid confusion, the users may see any updates (as appropriate) in both locations (e.g. semantic data view 105 and presentation data view 110). Accordingly, both semantic data view 105 and presentation data view 110 may be maintained in a computer's memory. Furthermore, commands may be interpreted either through semantic data view 105 or presentation data view 110 equally. Moreover, as will be described in more detail below, embodiments of the invention may include the ability to tab through shapes in presentation data view 110 based on the semantic model shown in the semantic data view 105.

As shown in FIG. 1, both apple in semantic data view 105 and apple in presentation data view 110 may be selected. Both selections may be maintained in the computer's memory. Regardless of where the selection takes place (e.g. in either semantic data view 105 or presentation data view 110), commands can operate on both. For example, if the focus is in semantic data view 105 and a red shape fill option is selected, the corresponding shape in presentation data view 110 may be updated.

Figure 2:
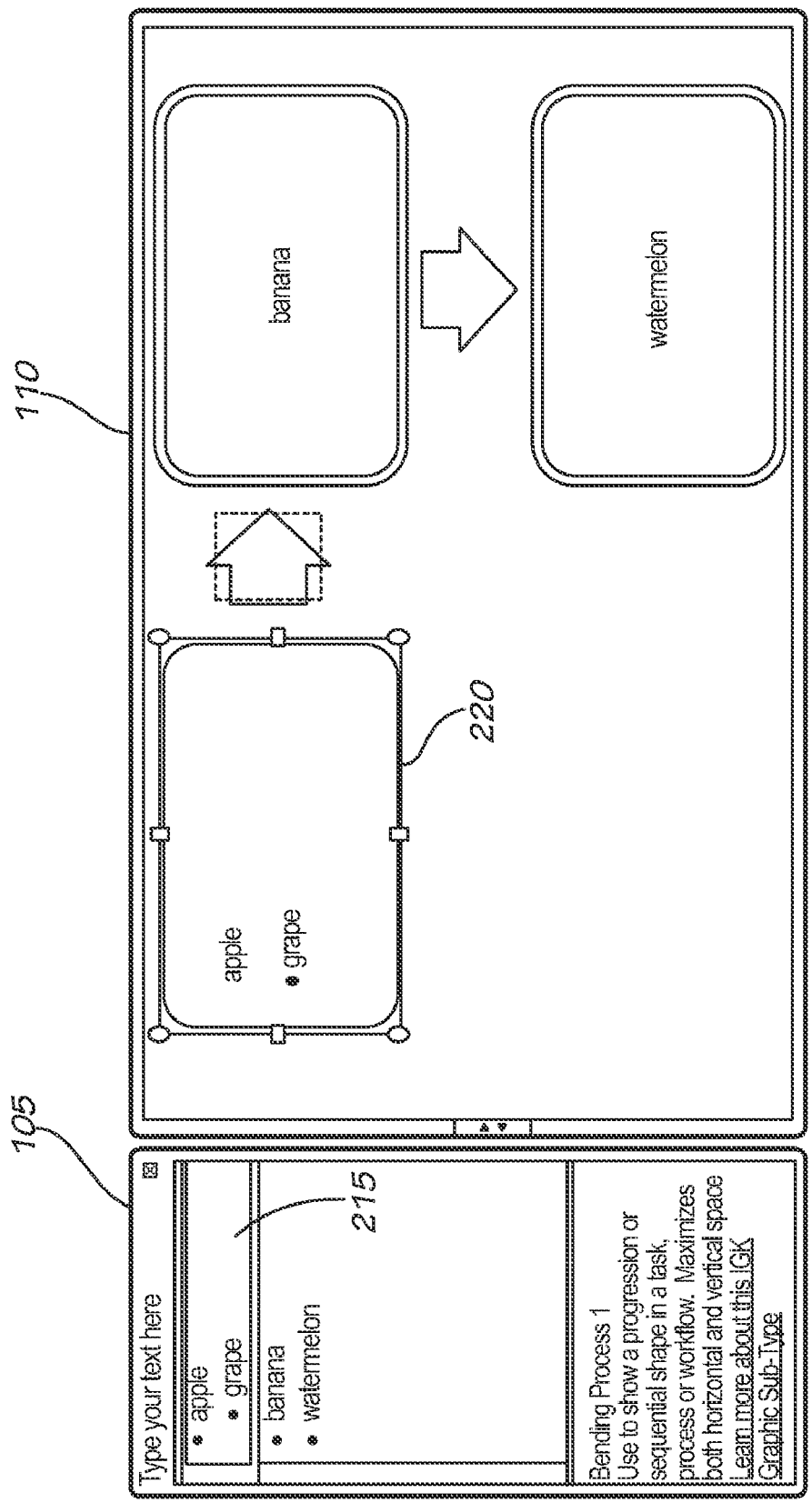
FIG. 2 shows a shape in a presentation data view having a multiple data set.

FIG. 2 shows a shape in presentation data view 110 having a multiple data set, for example, a first node 215. As shown in FIG. 2, both elements in first node 215 are selected in semantic data view 105. A corresponding shape 220 in presentation data view 110 may remain selected as long as either grape or apple is selected in first node 215 in semantic data view 105. Additionally, if a single node in semantic data view 105 was associated with two shapes in presentation data view 110, if either of those two shapes in presentation data view 110 is selected, that corresponding single node in semantic data view 105 may also be selected. Moreover, regardless of whether a customization is applied in presentation data view 110 or in semantic data view 105, a command associated with the customization may be acted against the drawing elements selected.

Figure 3:
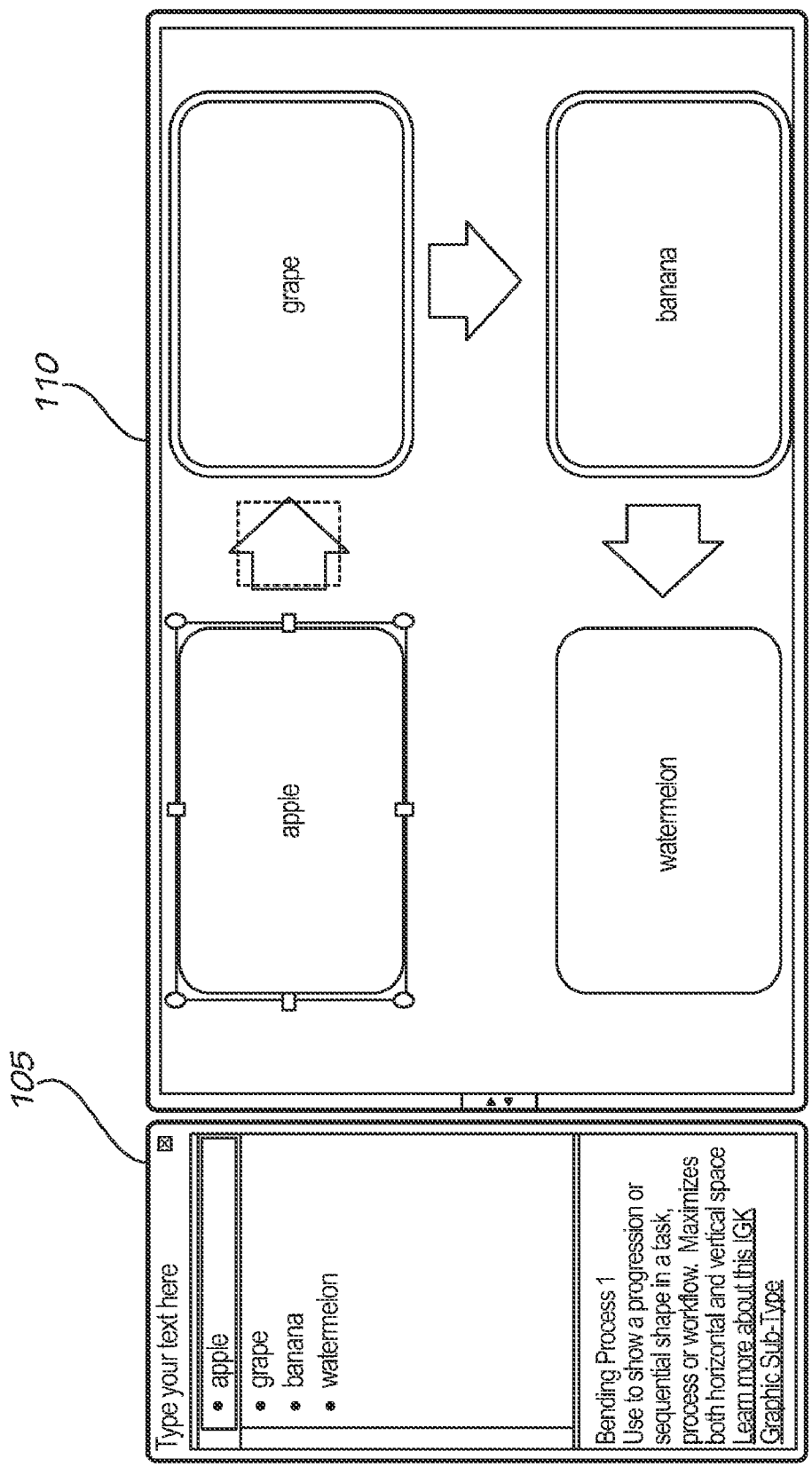
FIG. 3 shows tab navigation.
Figure 4:
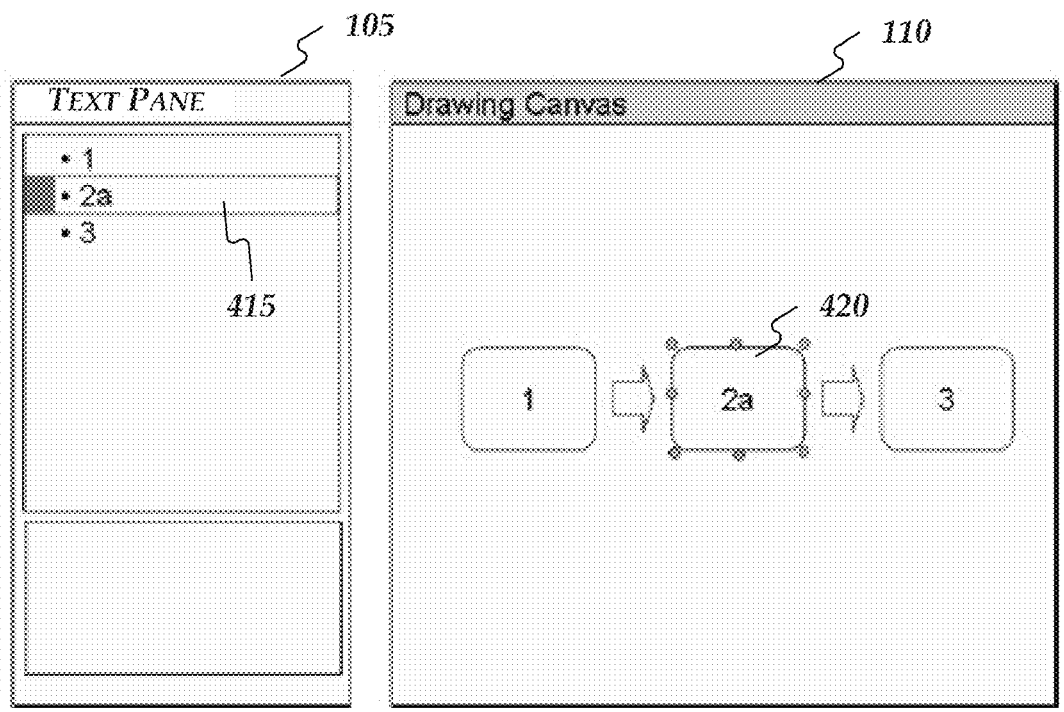
FIG. 4 shows a node selected in a presentation data view.
Figure 5:
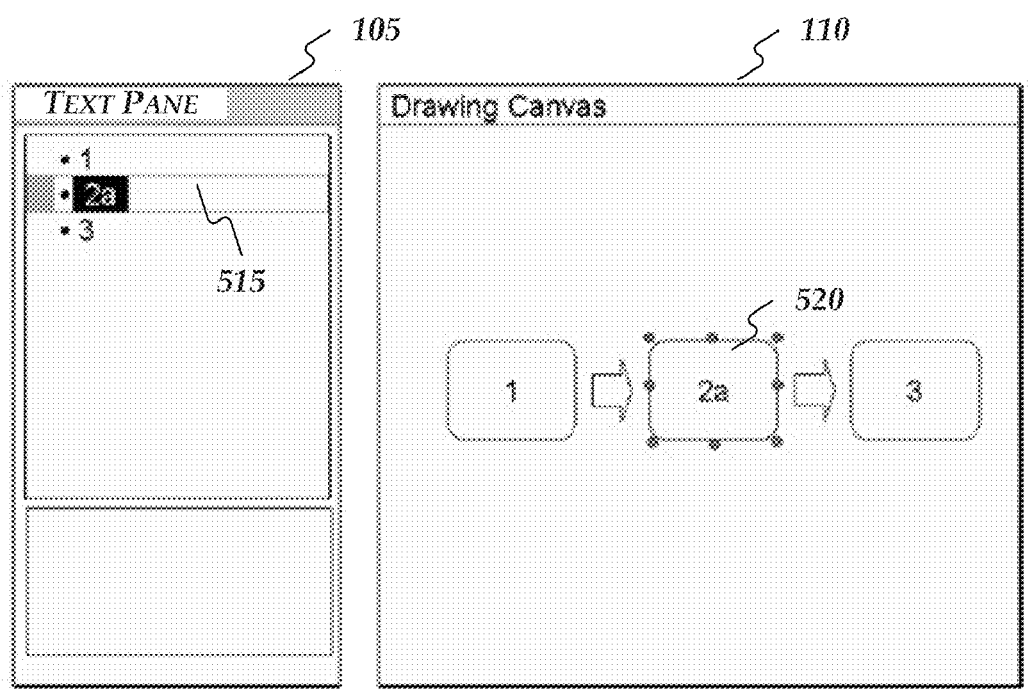
FIG. 5 shows a user switched focus to a semantic data view with a normal node selected in a presentation data view.

FIG. 3 shows tab navigation. For example, by pressing tab while in presentation data view 110, selection may move through the shapes in presentation data view 110 based on semantic ordering (i.e. the order shown in semantic data view 105). As shown in FIG. 3, selection may move from apple, to grape, to banana, to watermelon regardless of what order they were drawn in presentation data view 110. FIG. 4 shows a node 420 selected in presentation data view 110. Consequently, a corresponding selection 415 may appear in semantic data view 105 in an unfocused color. For example, if node 420 is selected in presentation data view 110, corresponding selection 415 may be selected in semantic data view 105. Because the focus is not on semantic data view 105, selection 415 in semantic data view 105 may be a disabled color. As shown in FIG. 5, if the user switches focus to semantic data view 105 with a normal node 520 selected in presentation data view 110, all of normal node 520's corresponding text 515 in semantic data view 105 may be selected. Consequently, selection handles corresponding to normal node 520 in presentation data view 110 may now be an unfocused color. Furthermore, if there multiple nodes selected in presentation data view 110 and the user switches focus, the text in all selected nodes in semantic data view 105 may be selected.

Figure 6:
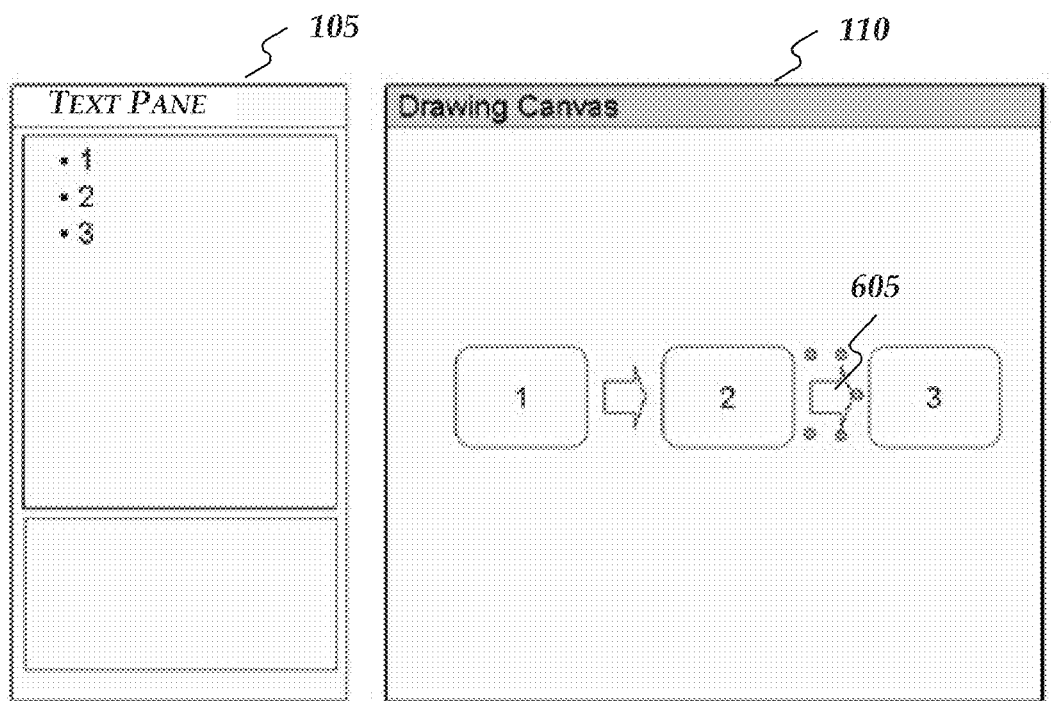
FIG. 6 shows selecting only transition shapes.

FIG. 6 shows selecting only transition shapes. For example, if any transition shape (e.g. transition shape 605) is selected in presentation data view 110, nothing may be selected in semantic data view 105. From here, if the user switches focus to semantic data view 105 (e.g. via the F6 key or clicking on the part of semantic data view 105 that contains the nodes), there may be no corresponding selection in semantic data view 105. As a result, the focus may revert to a default selection, for example, may be shown at the beginning of the text of the first node in semantic data view 105. If there are multiple transitions selected in presentation data view 110 and the user switches focus, an insertion point (IP) may also revert to a default setting. Consequently, FIG. 6 shows that selecting a transition in presentation data view 110 may result in no corresponding selection in semantic data view 105.

Figure 7:
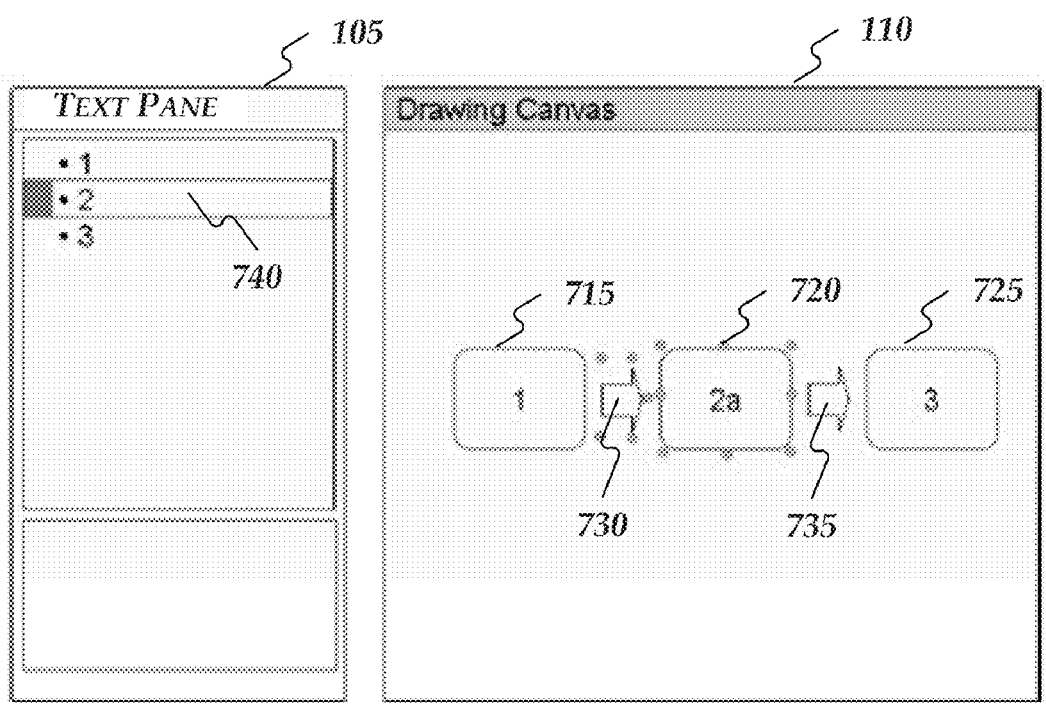
FIG. 7 shows selecting a combination of normal nodes and transition nodes.
Figure 8:
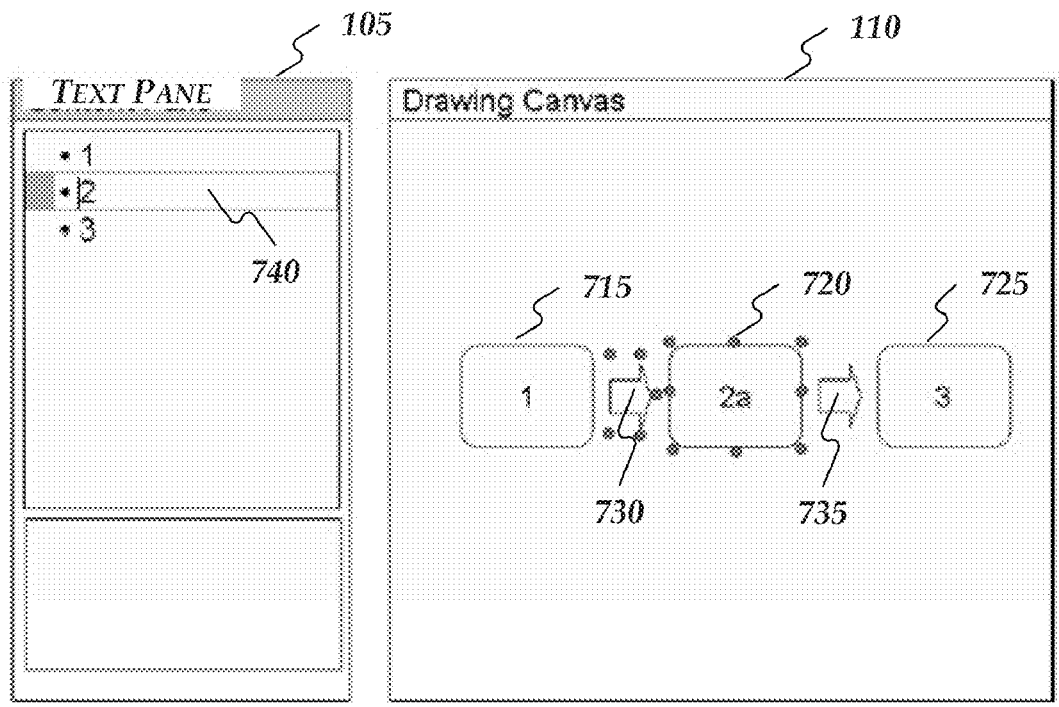
FIG. 8 shows a selection in a semantic data view when a user switches focus to a semantic data view from a presentation data view.

FIG. 7 shows selecting a combination of normal nodes and transition nodes. For example, if a multiple contiguous/discontiguous selection in presentation data view 110 contains nodes 715, 720, and 725 and transitions 730 and 735, a selection 740 in semantic data view 105 may only show the nodes selected. As shown in FIG. 7, node 720 is selected, as a result, selection 740 corresponds to node 720. As shown in FIG. 8, however, when the user switches focus to test pane 105 (e.g. pressing the F6 key), and may appear at the beginning of the text in corresponding semantic data view 105's selection 740. In other words, if the user selected a transition followed by a node, semantic data view 105 and presentation data view 115 may appear as shown in FIG. 7. When the user switches focus from presentation data view 110 to semantic data view 105, the IP may appear at the beginning of selection 740 because that is the first node in the corresponding semantic data view 105's selection (i.e. selection 740). Consequently, FIG. 8 shows a selection in semantic data view 105 when the user switches focus to semantic data view 105 from presentation data view 110.

Figure 9:
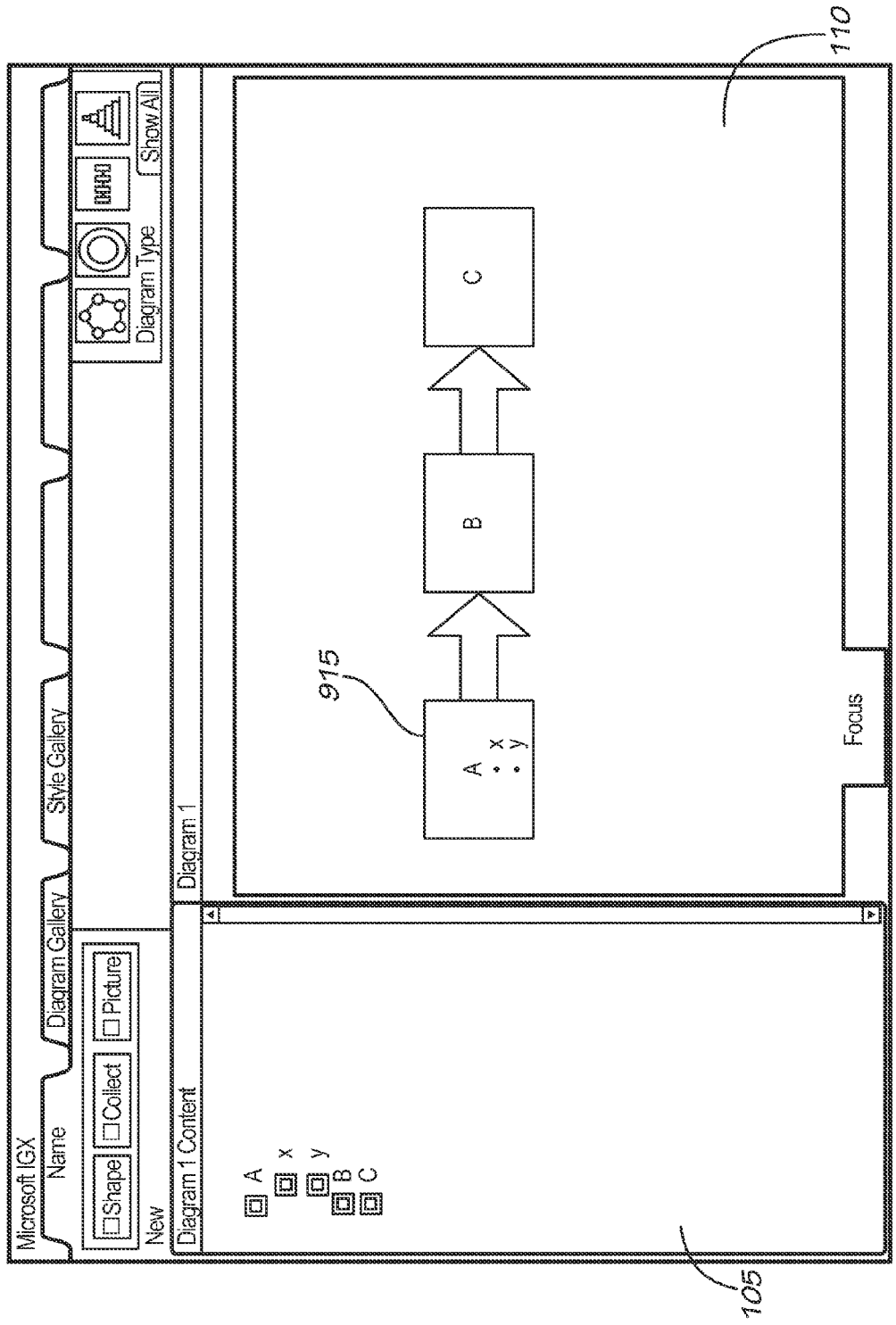
FIG. 9 shows selection of shapes with contained children.

FIG. 9 shows selection of shapes with contained children. For example, if a shape in presentation data view 110 is selected that contains multiple nodes (e.g. child nodes represented as a bulleted list), then all corresponding nodes in semantic data view 105 may be selected with a non-focus selection color. If the focus moves back to semantic data view 105, the corresponding nodes in semantic data view 105 may be selected with an in-focus selection color. If text in a shape 915 in presentation data view 110 should be selected, for example, by pressing F2 after shape 915 has been selected, then a focus switch to semantic data view 105 may also result in all the corresponding text being selected. When selecting shapes in presentation data view 110, the visible nodes may be selected and acted upon. For example, as shown in FIG. 9, there are parent transitions between: i) A and x; and ii) A and y, however transitions may not be rendered in the diagram shown in presentation data view 110. As a result, they may not be explicitly part of the selection as shown in FIG. 9. In other words, as shown in FIG. 9, shape 915 may be selected in presentation data view 110. All the nodes that are part of shape 915 may be automatically selected in semantic data view 105. This selection may be in gray as semantic data view 105 does not have the focus. Note that the selection visuals in FIG. 9 do not reflect the final design.

Figure 10:
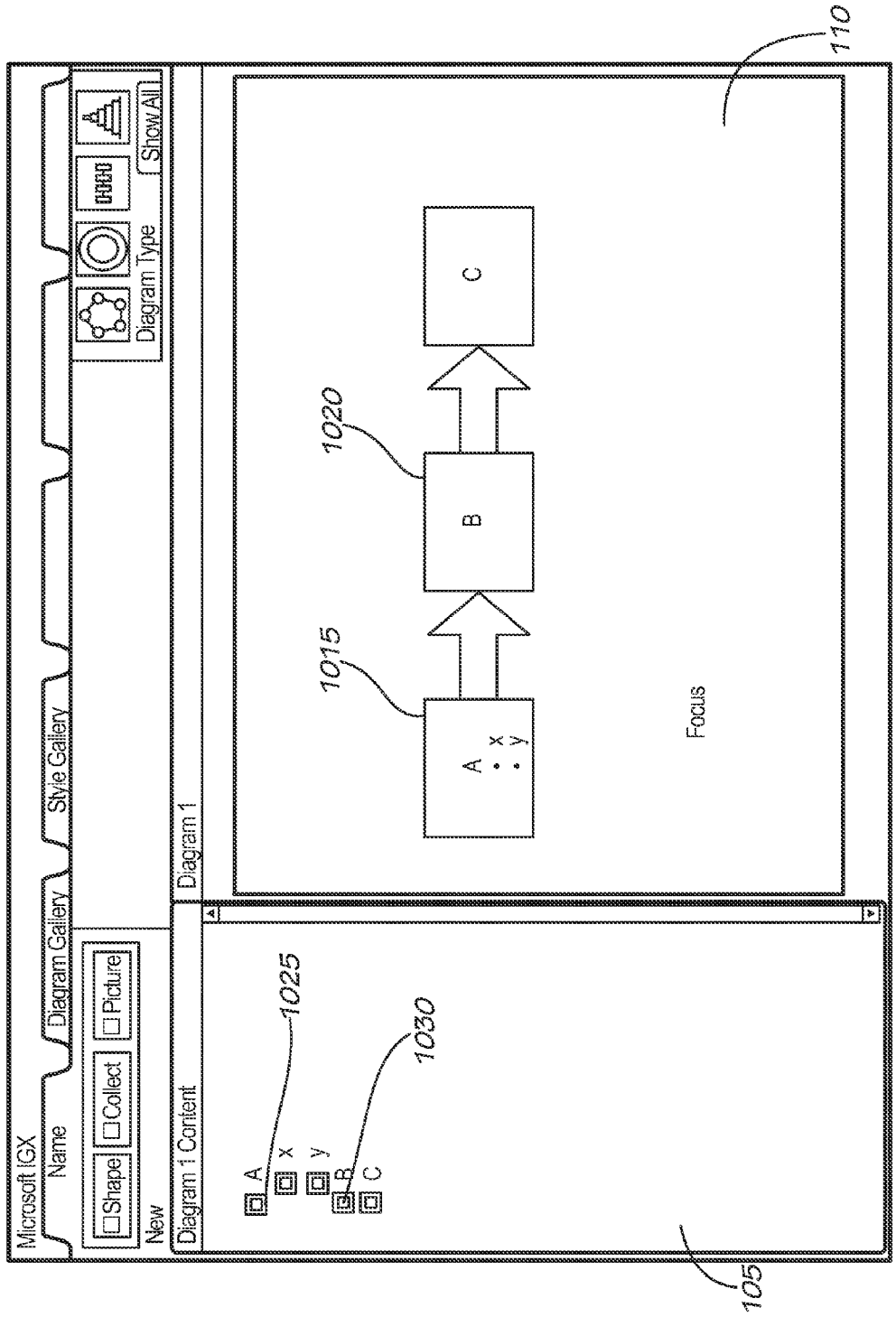
FIG. 10 shows continuous text selection.

FIG. 10 shows continuous text selection. For example, if shapes 1015 and 1020 are selected in presentation data view 110 that respectfully map to nodes 1025 and 1030 appearing next to each other in semantic data view 105, then all such nodes may be selected. Consequently, if the focus moves to semantic data view 105 all corresponding nodes in semantic data view 105 may be selected. If the focus moves back to presentation data view 110, both shapes 1015 and 1020 in presentation data view 110 should still be selected. In other words, shapes 1015 and 1020 (i.e. shapes "A" and "B") have been selected in presentation data view 110. Because all nodes contained in shapes 1015 and 1020 are continuous in semantic data view 105, all of the nodes may be selected.

Figure 11A:
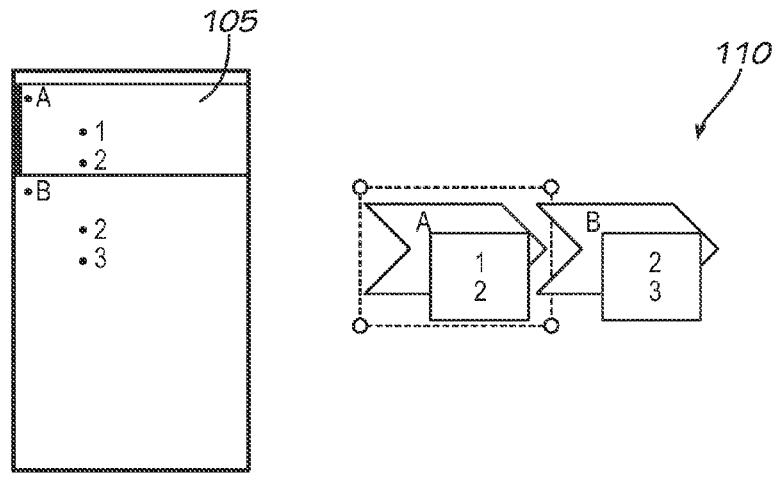
FIGS. 11A through 11C show grouped composite shapes.
Figure 11B:
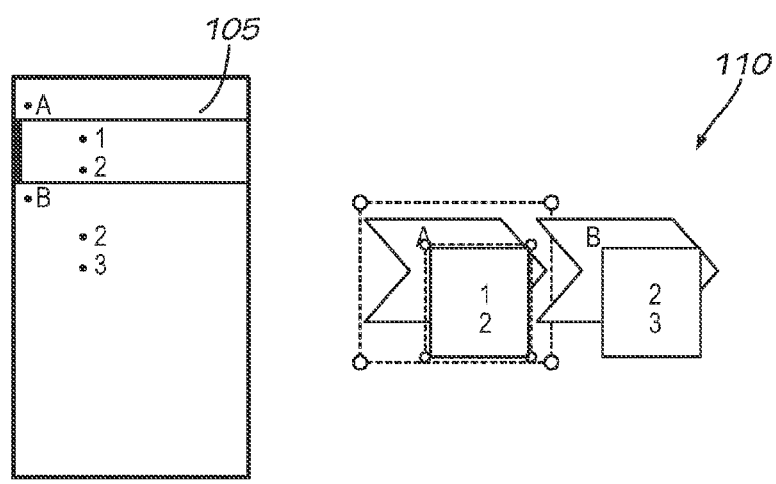
Figure 11C:
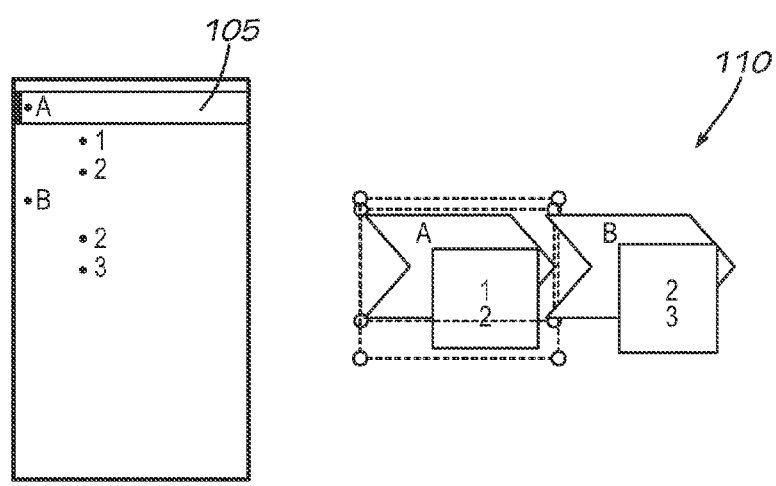

FIGS. 11A through 11C show grouped composite shapes. For example, if several shapes in presentation data view 110 map to one node in semantic data view 105, then the selection may correspond to the group selection in presentation data view 110. In other words, composite shapes may be rendered as groups. For example, if a user drills down into a shape that is a sub-shape of a group via presentation data view 110, or if the user clicks into a node, the selection in semantic data view 105 may surround the nodes in that sub-shape while other shapes in the group remain deselected. Furthermore, if the user selects in semantic data view 105, the selection may show that particular node in presentation data view 110.

In presentation data view 110, the user may either select that shape that corresponds to the node, or, if multiple nodes are displayed in one shape, the selection of the shape that contains the node may be shown. If there are multiple shapes that correspond to one node, then selecting in semantic data view 105 may select the shape in which the node is. Conversely, if a shape contains multiple nodes and the user selects that shape in presentation data view 110, the selection in semantic data view 105 may contain all of those nodes. Consequently, if the user selects a shape that contains multiple nodes in presentation data view 110, then the user may change focus to semantic data view 105. As a result, the selection may not be updated in semantic data view 105 to the single node the user selects until the user moves the IP or types. For example, when the user clicks in presentation data view 110 (FIG. 11A). If the user drills into a group presentation data view 110, semantic data view 105's selection may be updated (FIG. 11B). Then the user may click into semantic data view 105 and may select a group (FIG. 11C).

Figure 12:
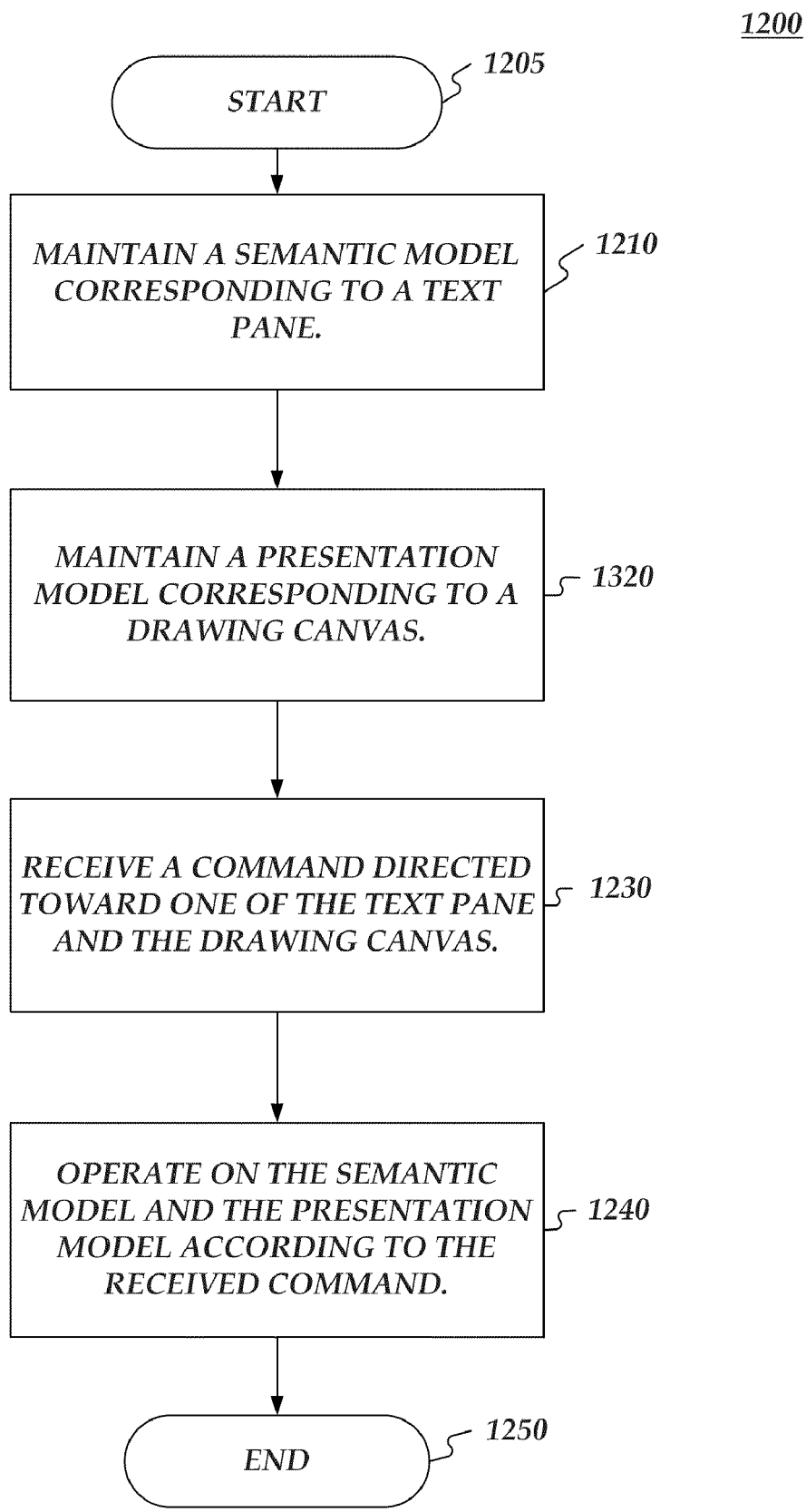
FIG. 12 is a flow chart of a method for managing data across a semantic data view and a presentation data view.

FIG. 12 is a flow chart setting forth the general stages involved in a method 1200 consistent with an embodiment of the invention for managing data across a semantic data view and a presentation data view. Method 1200 may be implemented using a computing device 1300 as described in more detail below with respect to FIG. 13. Ways to implement the stages of method 1200 will be described in greater detail below. Method 1200 may begin at starting block 1205 and proceed to stage 1210 where computing device 1300 may maintain a representation of a semantic model in semantic data view 105. From stage 1210, where computing device 1300 maintains the representation of the semantic model in semantic data view 105, method 1200 may advance to stage 1220 where computing device 1300 may maintain a representation of a presentation model in presentation data view 110. The represented presentation model may correspond to a graphical representation of the semantic model. For example, as shown in FIG. 1, both apple in semantic data view 105 and apple in presentation data view 110 may be selected. Both selections may be maintained in a computer's memory (e.g. in computing device 1300 system memory 1304 as described in more detail below). Regardless of where the selection takes place (e.g. in either semantic data view 105 or presentation data view 110), commands can operate on both. For example, if an IP is in semantic data view 105 and a red shape fill option is selected, the corresponding shape in presentation data view 110 may be updated.

Once computing device 1300 maintains the representation of the presentation model in presentation data view 110 in stage 1220, method 1200 may continue to stage 1230 where computing device 1300 may receive a command directed toward semantic data view 105 or presentation data view 110 from a user via input devices 1312. After computing device 1300 receives the command directed toward semantic data view 105 or presentation data view 110 in stage 1230, method 1200 may proceed to stage 1240 where computing device 1300 may operate on the semantic model and the presentation model according to the received command. For example, FIG. 2 shows a shape in presentation data view 110 having a multiple data set, for example, first node 215. As shown in FIG. 2, both elements in first node 215 are selected in semantic data view 105. A corresponding shape 220 in presentation data view 110 may remain selected as long as either grape or apple is selected in first node 215 in semantic data view 105. Additionally, if a single node in semantic data view 105 was associated with two shapes in presentation data view 110, if either of those two shapes in presentation data view 110 is selected, that corresponding single node in semantic data view 105 may also be selected.

Consistent with embodiments of the invention, many other commands may be received and many other operations may be performed as described, for example, above with respect to FIG. 1 through FIG. 11C. More examples of commands and operations are described as follows. For example, selecting a shape in presentation data view 110 may select all corresponding nodes in semantic data view 105. In addition, selecting a node in semantic data view 105 may select all corresponding shapes in presentation data view 110.

Moreover, removing a node from a previous state may leave a shape selected in presentation data view 110 if other semantic nodes are still selected that correspond with that shape. For example, if "A" and "B" are displayed in a shape and "A", "B", and the shape are selected, removing "B" from the selection may leave the shape selected because "A" may still be selected.

In the previous example, a command may apply to semantic nodes, but depending on the command, it may or may not apply to the nodes displayed in a selected shape that are not selected. For example, if "A" and "B" are displayed in the selected shape, but only A is selected, the type of command may determine whether to apply to only "A", or to apply to "A" and "B" both. Moreover the command may additionally apply to the shape, because the shape is selected. In other words, B is "implied" by the selection even though it is not selected. Once computing device 1300 operates on the semantic model and the presentation model according to the received command in stage 1240, method 1200 may then end at stage 1250.

An embodiment consistent with the invention may comprise a system for managing data across a semantic data view and a presentation data view. The system may comprise a memory storage and a processing unit coupled to the memory storage. The processing unit may be operative to maintain a semantic model in a semantic data view and a presentation model in a presentation data view. The presentation model may correspond to a graphical representation of the semantic model. The processing unit may be further operative to receive a command in one of the semantic data view and the presentation data view and to operate on the semantic model and the presentation model according to the received command.

Another embodiment consistent with the invention may comprise a system for managing data across a semantic data view and a presentation data view. The system may comprise a memory storage and a processing unit coupled to the memory storage. The processing unit may be operative to maintain a semantic model in a semantic data view. The semantic model may have at least one node including at least one sub-node. The processing unit may be operative to maintain a presentation model in a presentation data view. The presentation model may correspond to a graphical representation of the semantic model. The presentation model may include a shape corresponding to the at least one node. The presentation model may be configured to select the shape when at least one of the following are selected in the semantic data view: the at least one node and the at least one sub-node.

Yet another embodiment consistent with the invention may comprise a system for managing data across a semantic data view and a presentation data view. The system may comprise a memory storage and a processing unit coupled to the memory storage. The processing unit may be operative to maintain a semantic model in a semantic data view. The semantic model may have at least one node. In addition, the processing unit may be operative to maintain a presentation model in a presentation data view. The presentation model may correspond to a graphical representation of the semantic model. The presentation model may include at least two shapes corresponding to the at least one node. The presentation model may be configured to select the at least two shapes when the at least one node is selected in the semantic data view.

Figure 13:
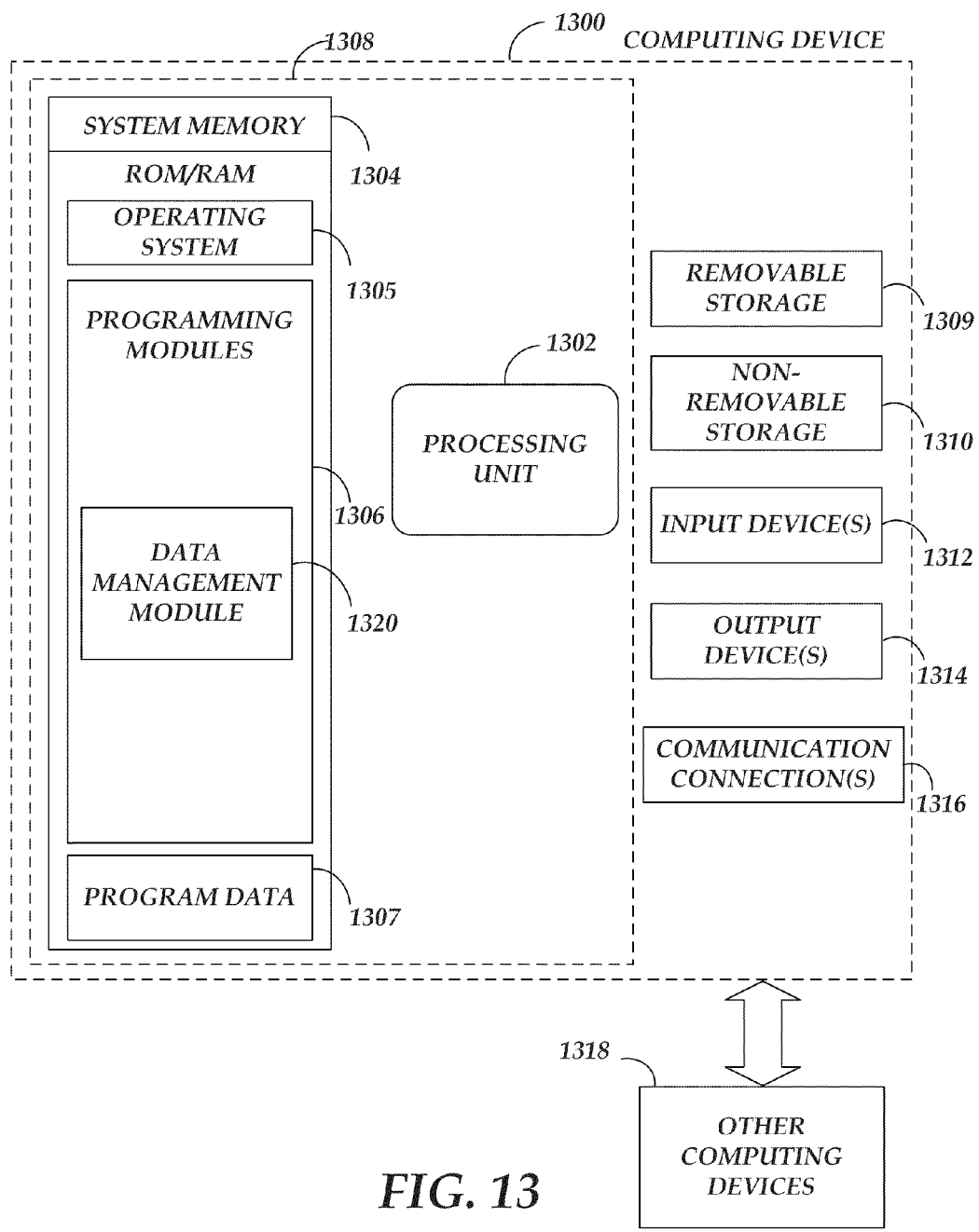
FIG. 13 is a block diagram of a system including a computing device.

FIG. 13 is a block diagram of a system including computing device 1300. Consistent with an embodiment of the invention, the aforementioned memory storage and processing unit may be implemented in a computing device, such as computing device 1300 of FIG. 13. Any suitable combination of hardware, software, or firmware may be used to implement the memory storage and processing unit. For example, the memory storage and processing unit may be implemented with computing device 1300 or any of other computing devices 1318, in combination with computing device 1300. The aforementioned system, device, and processors are examples and other systems, devices, and processors may comprise the aforementioned memory storage and processing unit, consistent with embodiments of the invention.

With reference to FIG. 13, a system consistent with an embodiment of the invention may include a computing device, such as computing device 1300. In a basic configuration, computing device 1300 may include at least one processing unit 1302 and a system memory 1304. Depending on the configuration and type of computing device, system memory 1304 may comprise, but is not limited to, volatile (e.g. random access memory (RAM)), non-volatile (e.g. read-only memory (ROM)), flash memory, or any combination. System memory 1304 may include operating system 1305, one or more programming modules 1306, and may include a program data file 1307. Operating system 1305, for example, may be suitable for controlling computing device 1300's operation. In one embodiment, programming modules 1306 may include, for example, data management module 1320. Furthermore, embodiments of the invention may be practiced in conjunction with a graphics library, other operating systems, or any other application program and is not limited to any particular application or system. This basic configuration is illustrated in FIG. 13 by those components within a dashed line 1308.

Computing device 1300 may have additional features or functionality. For example, computing device 1300 may also include additional data storage devices (removable and/or non-removable) such as, for example, magnetic disks, optical disks, or tape. Such additional storage is illustrated in FIG. 13 by a removable storage 1309 and a non-removable storage 1310. Computer storage media may include volatile and non-volatile, removable and non-removable media implemented in any method or technology for storage of information, such as computer readable instructions, data structures, program modules, or other data. System memory 1304, removable storage 1309, and non-removable storage 1310 are all computer storage media examples (i.e. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1300. Any such computer storage media may be part of device 1300. Computing device 1300 may also have input device(s) 1312 such as a keyboard, a mouse, a pen, a sound input device, a touch input device, etc. Output device(s) 1314 such as a display, speakers, a printer, etc. may also be included. The aforementioned devices are examples and others may be used.

Computing device 1300 may also contain a communication connection 1316 that may allow device 1300 to communicate with other computing devices 1318, such as over a network in a distributed computing environment, for example, an intranet or the Internet. Communication connection 1316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1304, including operating system 1305. While executing on processing unit 1302, data management module 1320 may perform processes including, for example, one or more method 1700's stages as described above. The aforementioned process is an example, and processing unit 1302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for managing data across multiple data views, the method comprising:
    displaying a semantic data view pane comprising semantic nodes of a data model;
    displaying a presentation data view pane comprising presentation nodes of the data model, wherein each presentation node corresponds to at least one semantic node and wherein each semantic node corresponds to at least one presentation node;
    receiving a modification at one of: the semantic data view pane and the presentation data view pane; and
    operating on, in response to the received modification, both the semantic data view pane and the presentation data view pane simultaneously, wherein operating on both the semantic data view pane and the presentation data view pane comprises simultaneously representing the modification at both the semantic data view and the presentation data view.

2. The method of claim 1, further comprising displaying at least one sub-node of the data model, the at least one sub-node being represented in both the semantic data view pane and the presentation data view pane.

3. The method of claim 2, further comprising:
    receiving a selection of at least one sub-node at either one of: the semantic data view pane and the presentation data view pane; and selecting all corresponding nodes associated with the selected at least one-sub node at the other one of: the semantic data view pane and the presentation data view pane.

4. The method of claim 2, further comprising providing transitions between the at least one sub-node of the data model and a corresponding parent node of the data-mode.

5. The method of claim 1, further comprising:
receiving a selection of one of: the at least one semantic node and the least one presentation node; and
selecting, in response the selection, the other one of: the at least one semantic node and the least one presentation node.

6. The method of claim 1, further comprising:
receiving a command at one of: the semantic data view pane and the presentation data view pane; and
invoking the received command at the other one of: semantic data view pane and the presentation data view pane.

7. A computer-readable storage medium comprising a set of instructions which when executed performs a method for managing data across multiple data views, the method executed by the set of instructions comprising:
displaying a semantic data view comprising at least one semantic node and at least one sub-node;
displaying a presentation data view comprising at least one shape associated with the at least one semantic node, wherein displaying the semantic data view and displaying the presentation data view comprises simultaneously displaying the semantic data view and the presentation data view;
providing at least one child node to the at least one shape, the at least one child node being associated with the at least one sub-node displayed at the semantic data view;
receiving a selection of the at least one shape containing the at least one child node at the presentation data;
causing, in response to the received selection, a selection of the at least one semantic node and the at least one sub-node corresponding to the selected at least one shape, the selection of the at least one semantic node being configured to occur simultaneously with the selection of the at least one shape; and
operating on, in response to a received modification at one of the semantic data view pane and the presentation data view pane, both the semantic data view pane and the presentation data view pane simultaneously.

8. The computer-readable storage medium of claim 7, wherein causing the selection of the at least one semantic node and the at least one sub-node corresponding to the selected at least one shape comprises causing a non-focused selection of the at least one semantic node and the at least one sub-node corresponding to the selected at least one shape.

9. The computer-readable storage medium of claim 7, further comprising grouping at least two shapes of the presentation data view into a composite shape.

10. The computer-readable storage medium of claim 9, further comprising mapping the composite shape to a single node at the semantic data view.

11. The computer-readable storage medium of claim 10, further comprising:
receiving a selection of the single node at the semantic data view; and
causing, in response to the selection, a selection of the at least two shapes at the presentation data view.

12. A computer-readable storage medium of claim 9, wherein grouping the at least two shapes of the presentation data view into the composite shape comprises grouping at least one sub-shape with the at least one shape.

13. A computer-readable storage medium of claim 7, further comprising:
removing the at least one child node at the presentation data view; and
maintaining the selection of the at least one semantic node corresponding to the at least one shape having its at least one child node removed.

14. A system for managing data across multiple data views, the system comprising:
a memory storage; and
a processing unit coupled to the memory storage, the processing unit being configured to:
display a semantic data view pane comprising semantic nodes of a data model;
display a presentation data view pane comprising presentation nodes of the data model, wherein each presentation node corresponds to at least one semantic node and wherein each semantic node corresponds to at least one presentation node;
provide at least one sub-node of the data model, the at least one sub-node being represented in both the semantic data view pane and the presentation data view pane;
receive a selection of at least one sub-node at either one of: the semantic data view pane and the presentation data view pane;
cause a selection of all corresponding nodes associated with the selected at least one-sub node at the other one of: the semantic data view pane and the presentation data view pane; and
operate on the semantic data view and the presentation data view simultaneously when receiving a command at any one of: the semantic data view and the presentation data view, wherein the processing unit being configured to operate on the semantic data view and the presentation data view simultaneously comprises the processing unit being configured to operate simultaneously represent the modification at both the semantic data view and the presentation data view.

15. The system of claim 14, wherein the processing unit is further configured to:
receive a selection of one of: the at least one semantic node and the least one presentation node; and
select, in response the selection, the other one of: the at least one semantic node and the least one presentation node.

16. The system of claim 14, wherein the processing unit is further configured to:
receive a command at one of: the semantic data view pane and the presentation data view pane; and
invoke the received command at the other one of: semantic data view pane and the presentation data view pane.

17. The system of claim 14, wherein the processing unit is further configured to:
receive a modification at one of: the semantic data view pane and the presentation data view pane; and
update, in response to the received modification, both the semantic data view pane and the presentation data view pane.

18. The system of claim 14, wherein the processing unit being configured to cause the selection of all the corresponding nodes associated with the selected at least one-sub node comprises the processing unit being configured to cause an unfocused selection of all the corresponding nodes associated with the selected at least one-sub node.

19. The method of claim 1, further comprising updating, in response to the received modification, both the semantic data view pane and the presentation data view pane, wherein updating, in response to the received modification, both the semantic data view pane and the presentation data view pane comprises updating the semantic data view pane and the presentation data view pane simultaneously.

20. The computer-readable storage medium of claim 7, wherein operating on, in response to received modification at one of the semantic data view pane and the presentation data view pane, both the semantic data view pane and the presentation data view pane simultaneously comprises simultaneously representing the modification at both the semantic data view and the presentation data view.

* * * * *